Dec. 22, 1959   O. J. BRITTON ET AL   2,917,819
METHOD FOR REPAIRING GLASS COATED APPARATUS
Filed April 9, 1956

INVENTORS.
ORSON J. BRITTON
AND ERNEST F. HOLTZ
BY
Edward H. Dumpston
THEIR ATTORNEY United States Patent Office 2,917,819
Patented Dec. 22, 1959

2,917,819

METHOD FOR REPAIRING GLASS COATED APPARATUS

Orson J. Britton, Pittsford, and Ernest F. Holtz, Chili, N.Y., assignors to Pfaudler Permutit Inc., a corporation of New York Application April 9, 1956, Serial No. 577,032

6 Claims. (Cl. 29—401)

This invention relates to glass or vitreous enamel coated apparatus, such as tanks and the like, and methods of repairing breaks or discontinuities in the coating thereof, one object of the invention being to provide an improved method of the character described.

In the manufacture of metallic equipment coated with a glass or vitreous enamel coating, it sometimes happens that small pits, cracks or other imperfections are found in the vitreous enamel coating. Further, during the service life of apparatus of this nature, such breaks or discontinuities may occur due to mechanical or thermal shock, or to localized corrosion in a particular area. Inasmuch as such apparatus is bulky, it is highly desirable to repair the pitted, chipped, or damaged lining in the field without dismantling the apparatus to return it to the factory for the application of a fresh coating of fused enamel thereto. For this reason another object of this invention is the provision of a method for the repair of glass coated apparatus in situ without the application of heat.

In the past, various methods have been developed for the repair of glass lined equipment in the field. The most satisfactory of these methods has been the application of threaded noncorrosive plugs having outwardly extending flange portions for covering the damaged portion of the enamel, as described in Patent 2,631,360. According to this method, the outwardly extending flange was sealed against the entrance of corrosive materials by means of noncorrosive cement or gaskets in combination with cement.

While this method has proven generally satisfactory, certain limitations arose, particularly where curved, dished, or other non-planar surfaces were to be repaired. In cases of this sort, it was found desirable to make the outwardly extending flange flexible for closer conformation and sealing contact with a non-planar surface on the glass coating surrounding the damaged area, or to depend on the effectiveness of the cement and the gaskets. We have found, however, that this practice may be improved by a new series of method steps which include the grinding of a planar area surrounding the break in the enamel coating in order to provide a true seat for the repair plug. This results in a close mating contact of the plug and the surrounding undamaged glass area, thereby assuring a tighter seal.

The method herein described possesses additional additional advantages in that a rigid plug may be effectively employed. According to the prior method wherein a plug having a substantially planar flange portion was tightened down against the non-planar surface of the surrounding glass, a certain amount of deformation of the plug flange was desirable, as referred to above, to enable the flange to yield to conform to the contour of the surrounding glass. This indicated the use of a plug with a flange having a certain degree of flexibility, in order to allow this limited deformation. However, according to the method herein disclosed, the planar plug flange is tightened against a ground planar surface, so that no yielding or deformation is incurred and an integral, rigid plug and flange may be employed.

Since a rigid plug may be used, an additional advantage is gained in that the plug may be coated with glass. In prior methods, glass coated plugs were unsuitable because of the tendency to deformation described above and resulting injury to any glass coating thereon. The use of glass coated plugs is particularly advantageous where the apparatus is used in connection with certain corrosive materials, or with certain plastic materials which tend to adhere to metallic surfaces and build up thereon.

Further objects of this invention include the provision of a method of repair which is simple, which may be applied without special skills, which is economical, and which will return the apparatus to use in the shortest possible time.

To these and other ends the invention resides in certain improvements and combinations of parts and method steps, all as will be hereinafter more fully described, the novel features being pointed out in the claims at the end of the specification.

Figure 1:
Fig. 1 is a transverse cross section of a fragment of a glass coated cylindrical metallic container having a break in the glass coating thereof.

In accordance with the method of this invention, when a pit or break 10 (Fig. 1) in the coating 12 of a glass or vitreous enamel lined container is discovered, the shattered glass adjacent to the break is preferably removed by grinding away the edges of the pit, as with a convex disk tool, to leave the surrounding glass in a sound condition with smooth edges. The grinding is preferably continued until a section of base metal 14 is uncovered, preferably adjacent to the center of the break as shown in Fig. 2.

Figure 2:
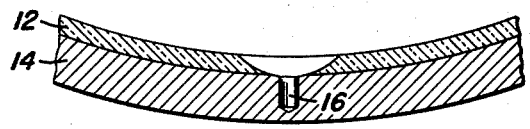
Fig. 2 shows a section of Fig. 1 having the glass ground away from the break and a hole drilled into the exposed metal.

A hole 16 is then drilled into the base metal adjacent the center of the ground away portion, as shown in Fig. 2. Hole 16 preferably extends only partly through the outer metal shell 14, as shown.

Figure 3:
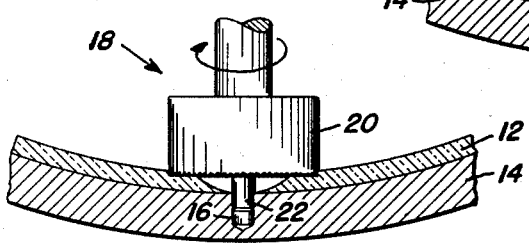
Fig. 3 is similar to Fig. 2 but shows a further step in the process of being ground.

A grinding tool 18 (Fig. 3) is then applied to the area surrounding the break in order to produce a planar surface. Grinding tool 18 preferably comprises a cylindrical body portion 20 having a planar face with a centrally located pilot pin 22 whose diameter allows it to fit loosely in the hole previously drilled. When tool 18 is applied, as shown in Fig. 3, with pilot pin 22 in the hole 16, and rotated, a round, flat portion is ground on the glass surrounding the break in order to produce a true, plane surface for repair. The grinding step is continued until a true plane surface is produced, but with a minimum of grinding through the sound glass coating and of exposure of the base metal.

When the latter grinding step is completed, hole 16 is threaded. This completes the preparation of the surface for the reception of a repair plug, as described below. The prepared surface is shown in Fig. 4.

Figure 7:
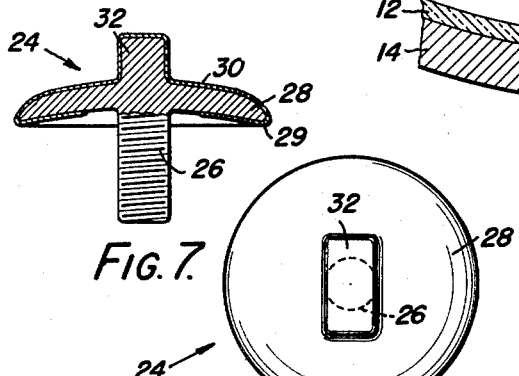
Fig. 7 is an enlarged cross sectional view of a repair plug employed in this invention.
Figure 8:
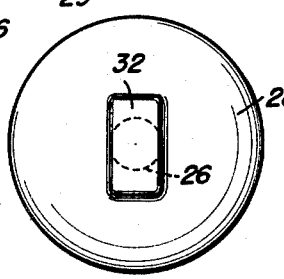
Fig. 8 is a top plan view of the plug of Fig. 7.

An integral metal repair plug 24 (Figs. 7 and 8), comprising a threaded stud portion 26 (Fig. 7) and a substantially circular head or flange portion 28, is provided for repairing the break. Plug 24 is preferably made of a corrosion resistant alloy suitable for coating with glass or vitreous enamel. Inconel and certain stainless steels have been found satisfactory for this purpose, but other suitable metals may be used. The bottom surface of flange 28 is somewhat concave in form, and the edges thereof are turned downwardly to form a lip 29. The entire upper surface of flange 28 is covered by a coating of glass or vitreous enamel 30, of a composition similar to that used in coating the tank. Coating 30 extends downwardly over the edge of flange 28, covering lip 29, and partially covering the lower surface thereof. An upstanding boss 32 of rectangular or other non-circular cross section may be provided to allow gripping of the plug by a wrench or other turning tool 34, indicated in Fig. 5.

Figure 4:
Fig. 4 shows the further step of tapping the hole for the application of a repair plug.
Figure 5:
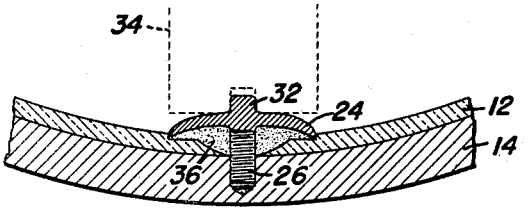
Fig. 5 shows a repair plug cemented into place.

In practice, corrosion resistant cement 36 is applied to the plug and the prepared surface shown in Fig. 4, and the stud 26 of the repair plug is inserted in hole 16. The plug is then screwed down tight, squeezing out the excess cement, as shown in Fig. 5. After the plug is tightened, the downwardly depending lip 29 comes into close mating contact with the previously prepared planar surface ground in the glass lining of the tank as described above, forming a tight and substantially impervious seal. The corrosion resisting cement 36 assures perfect sealing of the repair.

Figure 6:
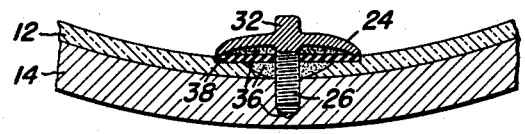
Fig. 6 shows a repair plug provided with a gasket and cemented into place.

If desired, the cement may be supplemented by a resilient, non-corrosive gasket 38 of Teflon, or the like, as shown in Fig. 6. In either case, only the extreme edge of the gasket or the cement are exposed to corrosive attack by the material in the tank since downwardly turned lip 29 of flange 28 forms a tight, and practically impervious seal with the ground surface, as described above.

In the method constituting this invention, only glass is exposed to the contents of the apparatus, with the exception of the thin edge of either the gasket or the cement as described above. Thus, a repair carried out by the method herein described insures a piece of equipment having substantially the corrosion resistance and other desirable properties of an original undamaged glass or vitreous enamel coated tank. Further, since the flange of the plug is seated on a ground, planar surface, a tight seal is obtained with minimum reliance on the cement or the gasket.

No special skills are required for completing a repair according to this method, since the only required steps are grinding and threading which may be accomplished by any mechanic in the user's plant. The process is simple, quick, convenient, inexpensive, and produces a repair having all the advantages of the original glass lined tank.

It will thus be seen that the invention accomplishes its objects, and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

We claim:

1. The method of repairing a discontinuity in the coating of a glass coated metallic vessel comprising the steps of drilling a hole at the discontinuity, grinding a flat area on the undamaged glass coating surrounding the discontinuity, threading said hole, and securing a repair plug in said hole, said plug having a threaded stud portion for engagement in said hole and a glass coated flange portion substantially conforming in size and shape to said ground area and overlying said area in sealing contact therewith.

2. The method of repairing a discontinuity in the coating of a glass lined metallic vessel comprising the steps of grinding away the glass at said discontinuity, drilling and threading a hole at said ground away portion, grinding a flat area on the undamaged coating surrounding said ground away portion, applying corrosion resistant cement to the ground away portion, and securing a repair plug in said threaded hole, said plug having a threaded stud portion for engagement in said hole and a glass coated flange portion substantially conforming in size and shape to said area to cover the same and said cement and to come into sealing contact with said flat area.

3. The method of repairing a discontinuity in the coating on the curved portions of a glass coated metallic vessel comprising the steps of grinding away the glass at said discontinuity, drilling a hole at said ground away portion, grinding a planar area on the undamaged coating surrounding said ground away portion, threading said hole, and securing a repair plug in said hole, said plug having a threaded stud portion for engagement in said hole and a glass coated flange portion substantially conforming in size and shape to said planar area to cover the same and come into sealing contact with said area.

4. The method of repairing a discontinuity in the coating of a glass lined metallic vessel comprising the steps of grinding away the glass at said discontinuity, drilling a hole at said ground away portion, employing the hole to receive and center a grinding tool having a central pilot pin loosely fitting said hole and grinding a flat area on the undamaged coating surrounding said ground away portion, threading said hole, and securing a repair plug in said hole, said plug having a threaded stud portion for engagement in said hole and a glass coated flange portion substantially conforming in size and shape to said flat area to overlie said area in sealing contact therewith.

5. The method of repairing a discontinuity in the coating of a glass lined metalic vessel comprising the steps of grinding away the glass at said discontinuity, drilling a hole at said ground away portion, grinding a flat area on the undamaged coating surrounding said ground away portion, threading said hole, placing a gasket over said flat area, and securing a repair plug in said hole and over said gasket, said plug having a threaded stud portion for engagement in said hole and a glass coated flange portion substantially conforming in size and shape to said flat area and gasket to cover the same.

6. The method of repairing a discontinuity in the coating of a glass lined metallic vessel comprising the steps of grinding away the glass at said discontinuity, drilling a hole at said ground away portion, grinding a flat area on the undamaged coating surrounding said ground away portion, threading said hole, applying corrosion-resisting cement to said flat area, placing a gasket over said cement and securing a repair plug in said hole and over said gasket, said plug having a threaded stud portion for engagement in said hole and a glass coated flange portion substantially conforming in size and shape to said flat area and gasket to cover the same.

References Cited in the file of this patent

UNITED STATES PATENTS

| | | |
|---|---|---|
| 116,636 | Selden | July 4, 1871 |
| 2,384,324 | Martin | Sept. 4, 1945 |
| 2,444,099 | Hennessey | June 29, 1948 |
| 2,631,360 | Sanford | Mar. 17, 1953 |
| 2,722,734 | Grant | Nov. 8, 1955 |